2,911,187

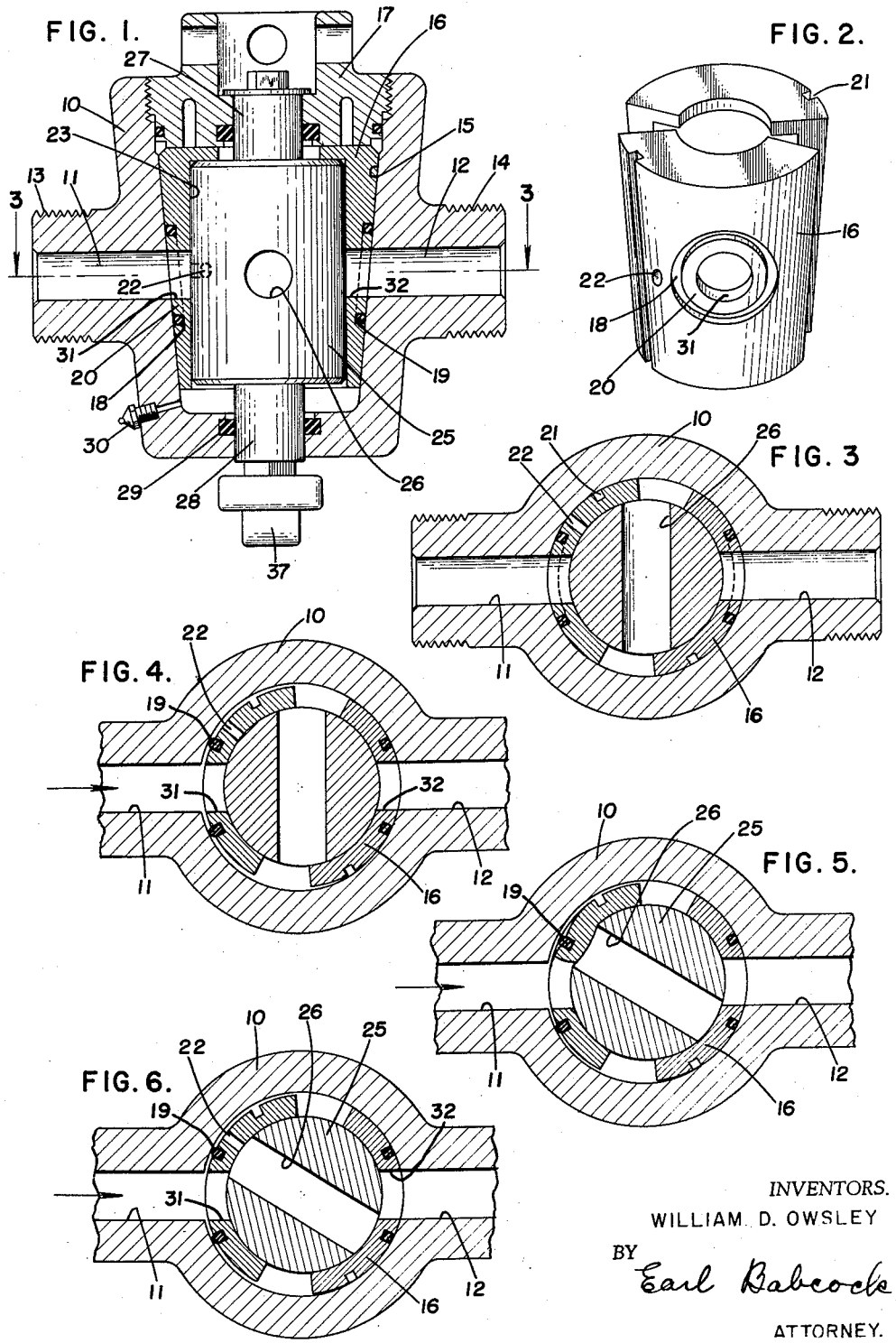

HIGH PRESSURE PLUG VALVE

William D. Owsley, Duncan, Okla., assignor to Halliburton Oil Well Cementing Company, Duncan, Okla.

Application February 28, 1958, Serial No. 718,217

1 Claim. (Cl. 251—316)

This invention relates to plug valves and more particularly to plug valves used in the oil fields in lines subjected to extremely high pressures.

In the U.S. patent to Stogner, No. 2,813,695 granted November 19, 1957, there is disclosed a plug valve which has been found to have very important advantages when used in high pressure lines. It employs a tapered insert, which fits in a tapered bore in the valve body and serves as a bearing for the plug. The insert is provided with circular grooves in which O-rings are mounted to maintain seals adjacent the inlet and outlet passageways through the valve body and prevent leakage between the valve body and the insert. The cutting of the circular grooves in the insert provides lands (designated 20 in said patent) the upstream one of which is subjected to high fluid pressure and which deforms and presses against the plug, when the valve is closed, to prevent leakage.

Extensive field use of the Stogner valve has proven that it has excellent operational characteristics. However, when this valve has been connected into a high pressure line, and subjected to certain conditions perhaps not fully understood, fluid has leaked into the space between the valve body and the insert when the plug is in the closed position. When this has occurred, the plug "locks" just as it is turned to the position where its bore is initially exposed to the downstream fluid pressure in the line. An examination of a number of inserts, after this has happened, has revealed the fact that the inlet or upstream side of each insert has been partially extruded into the upstream end of the bore of the plug.

The insert of the Stogner valve has to be made of a material which is malleable, or has a certain amount of ductility, in order for the upstream land to function effectively. As a result, there appears to be some tendency for this upstream land, and the area of the insert immediately adjacent it, to be pushed out or "flow" into the bore of the plug when a sudden large pressure drop occurs just as the plug is turned from closed to "cracked," open position.

It is an object of the present invention to improve upon the high pressure plug valve of the above cited Stogner patent by providing means for reducing the pressure drop across the upstream land and the area of the insert immediately adjacent to it when the plug is turned from the closed to the "cracked," open position, thereby overcoming the tendency of the valve to "lock" in the "cracked," open position.

Other objects of the invention will become apparent upon consideration of the following description, taken in connection with the accompanying drawing, in which:

Figure 1 is a vertical cross-sectional view of a valve constructed in accordance with the present invention;

Figure 2 is a perspective view of the insert used in the valve of Figure 1;

Figure 3 is a horizontal cross-sectional view of the valve of Figure 1 illustrating the position of the parts when the valve is closed but not subjected to high pressure;

Figure 4 is a fragmentary horizontal cross-sectional view of the valve of Figure 1 similar to Figure 3, but illustrating, somewhat exaggerated, distortion due to high pressure with the upstream side to the left;

Figure 5 is a fragmentary horizontal cross-sectional view of a valve like that of the Stogner Patent 2,813,695 illustrating (exaggerated) what happens when it is subjected to high upstream pressure (from the left) and the plug turned to the "cracked," open position; and Figure 6 is a fragmentary horizontal cross-sectional view of the valve of Figures 1–4 illustrating what happens when it is subjected to high upstream pressure (from the left) and the plug turned to the "cracked," open position.

Referring to the drawing in detail, and first to the illustrations of Figures 1–4, it will be seen that a valve is there illustrated as including a main body 10 provided with inlet and outlet passageways 11 and 12. The body 10 may be threaded as shown at 13 and 14 to make connections with pipe.

It will be seen that the valve body 10 is provided with a tapered bore 15 at right angles to the passageways 11 and 12. Within this tapered bore there is an insert 16 housing a cylindrical plug 25. As shown in Figure 2 this insert 16 is split longitudinally so as to provide two sections. As shown in Figures 3 and 4, the edges of the two sections are diagonal with respect to the passageways 11 and 12. The plug 25 has an ordinary passageway 26, and it will be seen that the plug can be rotated 90 degrees without the passageway 26 completely crossing the edges of the two sections of the insert 16. The insert 16 has an outer tapered or conical surface conforming to the taper of the bore 15. When mounted in the bore 15, the insert 16 may be forced downwardly by a suitable cap 17 threaded into the top of the tapered bore 15 of the valve body. It is noted that a force thus applied resolves into a normal contacting force between the insert 16 and the plug 25 which will be proportional to the downward force applied.

The insert 16 is provided with passageways 31 and 32 aligned with passageways 11 and 12. It also has two circular grooves 18 which are concentric with the passageways 31 and 32. Suitable O-rings 19 are mounted in these grooves 18 so as to maintain a seal between the bore 15 and the insert 16. The arrangement is such that there is an annular land 20 on each side of the insert 16 concentric with the passageways 31 and 32. These lands 20 may be referred to as the areas which, when subjected to pressure, tend to deform the insert. For example, assuming that the passageway 11 is the inlet of the valve, the land 20 at the left of Figure 1 is subjected to the pressure of the fluid in the passageway 11 when the valve is closed as shown in Figure 1. Due partly to resiliency of the insert 16 and due partly to the reduced sectional area at groove 18, the lands 20 are supported on the remainder of insert 16 with some flexibility. Upon the inlet land 20 being subjected to fluid pressure, said pressure is transmitted to a like area of the interior cylindrical surface of the insert bore 23. This pressure, when applied, is in addition to that imposed by cap 17. Also of note is the fact that the O-rings 19 obviate the need for a lapped contact surface between the insert 16 and the bore 15.

At a suitable point adjacent one of the lands 20, just to one side of one of the O-rings 19, as shown in Figures 1–4 and 6, the insert 16 is provided with a small relief port 22. The purpose of this port 22 will be explained hereinafter, in connection with the explanation of Figures 4, 5 and 6. It will be observed that the relief port 22 is located in the path of the passageway 26 of the plug 25 when the passageway 26 is turned from its closed position to a point immediately adjacent the inlet passageway 11 of the valve body 10.

The insert 16 is held against rotation within the valve body at all times. The means for holding it against rotation may be of any suitable form. In the arrangement illustrated, grooves are provided on the insert as shown at 21 and suitable pins (not shown) are mounted in the valve body 10 and these project into the grooves 21. The plug 25 abuts against this flange so that the plug and insert move together, axially, and upwardly when the plug is subjected to hydraulic forces which tend to lift it. The plug 25 has cylindrical projections 27 and 28 thereon for mounting it in the valve body 10 and in the cap 17 as illustrated. Suitable packing is provided as shown at 29 to prevent leakage through the valve body and cap and the spaces between the plug 25 and the packing 29 may be suitably lubricated. A fitting 30 is shown for supplying lubricant to these passages.

In Figure 1 of the drawing, the valve is shown closed. To rotate the valve to the open position a handle 37 is provided. Some means should be provided to limit rotation of the plug to 90°. As viewed in Figure 3, the plug 25 should be rotated in a counterclockwise direction to open it. Means should be provided to prevent the plug from rotating clockwise from the position shown in Figure 3 so as to insure against the passageway 26 traveling across the joints of the two sections of insert 16.

From the above description, it will be clear that when the valve illustrated is used in a high pressure line in a closed position, extreme pressure will be exerted on the land 20 found on the inlet side of said valve. The O-ring 19 adjacent that land will prevent the high pressure from being exerted over the area of the insert exterior of the groove 18.

Ordinarily, there is no leakage past the O-ring 19 on the upstream side of the valve, and no leakage between the insert and the upstream side of the plug due to the deformation of the land 20 against the upstream side of the plug. The parts will then remain in the position shown in Figure 3.

However, should even the slightest amount of leakage occur, the entire valve body 10 will swell, and the plug 25 and insert 16 will then be eccentrically disposed in the body 10, as illustrated in Figure 4. Most of the sealing of the valve will then be on the downstream side, and the entire cavity of the valve body 10 will be subjected to the upstream pressure.

Under such extreme conditions, when the plug is rotated to the "cracked," open position, a certain amount of extrusion of the insert 16 into the bore 26 of the plug 25 tends to take place. Unless means is provided to prevent it, the insert 16 becomes "locked" to the plug 25, as illustrated in Figure 5, where the construction of the insert is like that of the prior art Stogner Patent 2,813,695.

In Figures 4, 5 and 6, let it be assumed that the high pressure is on the left of the valve body as indicated by the arrows, and that the plug 25 is to be rotated counter-clockwise to bring it to its full open position.

If the annular space between the insert 16 and the valve body 10, outside of the upstream O-ring 16, is under high pressure, the parts will be as illustrated in Figure 4.

As the plug 25 is rotated from the position shown in Figure 4 to the position shown in Figure 5, just as the passageway 26 reaches the edge of the passageway 12, there is a sudden and violent drop in pressure within the passageway 26. At the same instant, there is some flow from the inlet passageway 11 into the passageway 26 but this flow is not sufficient to bring the pressure in the passageway 26 up to that in the inlet passageway 11.

The pressure in the annular space between the body 10 and the insert 16 is, at this instant of "cracking" the valve, very high, being equal to that prevailing in the inlet passageway 11 before the plug 25 was turned out of the position shown in Figure 4.

As a result an area of the insert 16, substantially corresponding in size to the transverse area of the passageway 26, is subjected to a high difference in pressure.

The provision of the port 22 in the wall of the insert adjacent the upstream O-ring 19 relieves the pressure thus created, so that when the plug 25 reaches the "cracking," open position, no distortion or extrusion of the insert 16 takes place. The insert 16 retains its normal shape, as shown in Figure 6. There is thus no "locking" action between the insert 16 and the plug 25, and the plug can be turned onwardly to its full open position without difficulty.

While only one embodiment of the invention has been described herein, it is obvious that various changes may be made without departing from the spirit of the invention or the scope of the annexed claims.

I claim:

A plug valve comprising a valve body having an inlet passageway, an outlet passageway and a tapered bore transversely disposed with respect to said passageways, a tapered insert located in said tapered bore, said insert having passageways aligned with the passageways of said valve body and two circular grooves concentric with its passageways to provide a circular land concentric to each of its passageways and a small relief port extending through its wall, adjacent one of said grooves and one of said lands, O-rings mounted in said grooves for maintaining seals between the insert and the tapered bore, a cylindrical plug rotatably mounted in said insert and having a passageway therethrough adapted to be selectively turned into an open position or into a closed position with respect to the passageways in the valve body and in the insert, said relief port being located in the path of the passageway through the plug when it is immediately adjacent the inlet passageway of said valve body, the arrangement being such that fluid pressure exerted in the inlet passageway will tend to maintain intimate sealing contact between the insert and plug, in the vicinity of said inlet passageway, and at the same time prevent extrusion of said insert into the passageway of said plug as the plug is turned from its closed to its open position.

References Cited in the file of this patent

UNITED STATES PATENTS

| | | |
|---|---|---|
| 2,510,514 | Mueller | June 6, 1950 |
| 2,713,989 | Bryant | July 26, 1955 |
| 2,813,695 | Stogner | Nov. 19, 1957 |